(12) United States Patent
Zuber et al.

(10) Patent No.: US 8,221,021 B2
(45) Date of Patent: Jul. 17, 2012

(54) CONNECTION BETWEEN A TUBULAR MEMBER OF STEEL AND A STRUCTURE OF ALUMINUM

(75) Inventors: Armin Zuber, Bad Lippspringe (DE); Jürgen Krogmeier, Hövelhof (DE); Rudi Töws, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 134 days.

(21) Appl. No.: 12/540,778

(22) Filed: Aug. 13, 2009

(65) Prior Publication Data

US 2010/0040408 A1 Feb. 18, 2010

(30) Foreign Application Priority Data

Aug. 14, 2008 (DE) .......................... 10 2008 037 709

(51) Int. Cl.
*F16B 11/00* (2006.01)

(52) U.S. Cl. ......... 403/265; 403/268; 403/270; 403/272

(58) Field of Classification Search .................. 228/246, 228/262.43, 262.44, 135–137, 173.4, 262.5–262.51, 228/262.41, 262.42; 285/334.5, 288.1–288.11, 285/173.1, 173.4; 29/525.13, 525.14, 530; 428/653; 403/265–272

See application file for complete search history.

(56) References Cited

U.S. PATENT DOCUMENTS

| 4,407,441 | A | * | 10/1983 | Aarts | ............................. | 228/176 |
| 5,492,376 | A | * | 2/1996 | Usui et al. | ..................... | 285/382 |
| 2009/0152865 | A1 | * | 6/2009 | Zuber et al. | .............. | 285/288.11 |

FOREIGN PATENT DOCUMENTS

DE 195 19 576 B4 12/1996
DE 102007060116 A1 * 6/2009

* cited by examiner

*Primary Examiner* — Victor MacArthur
(74) *Attorney, Agent, or Firm* — Henry M. Feiereisen; Ursula B. Day

(57) ABSTRACT

In an assembly including a tubular member made of steel and a structure made of aluminum, the tubular member has an end portion for engagement in a recess of the structure. At least one receptacle is provided between the end portion of the tubular member and the structure and filled with a welding filler containing aluminum as base material for effecting a connection between the tubular member and the structure.

9 Claims, 3 Drawing Sheets

CONNECTION BETWEEN A TUBULAR MEMBER OF STEEL AND A STRUCTURE OF ALUMINUM

CROSS-REFERENCES TO RELATED APPLICATIONS

This application claims the priority of German Patent Application, Serial No. 10 2008 037 709.0, filed Aug. 14, 2008, pursuant to 35 U.S.C. 119(a)-(d), the content of which is incorporated herein by reference in its entirety as if fully set forth herein.

BACKGROUND OF THE INVENTION

The present invention relates, in general, to a connection between a tubular member of steel and a structure of aluminum.

The following discussion of related art is provided to assist the reader in understanding the advantages of the invention, and is not to be construed as an admission that this related art is prior art to this invention.

German Pat. No. DE 195 19 576 B4 describes a welded axle unit for a vehicle, whereby a tubular member has an end portion for placement in a recess of a sleeve-like structure at a radial distance. The end portion has two circular-ring-shaped butt surfaces in axially-spaced apart relationship which are pressed against respectively configured counter surfaces and connected with these counter surfaces through friction welding. The butt surface on the end face of the end portion and the respective counter surface on the bottom of the recess extend perpendicular to the length axis of the tubular member. A radial collar is provided on the tubular member at a distance to these surfaces and is formed with a conical butt surface which is pressed against a conical counter surface on an end face of the sleeve.

It would be desirable and advantageous to provide an improved connection between a tubular member of steel and a structure of aluminum to obviate prior art shortcomings and to attain weight-savings while allowing a simple implementation.

SUMMARY OF THE INVENTION

According to one aspect of the present invention, in combination, an assembly includes a tubular member made of steel and having an end portion, a structure made of aluminum and having a recess for engagement of the end portion, and at least one receptacle provided between the end portion of the tubular member and the structure and filled with a welding filler containing aluminum as base material for effecting a connection between the tubular member and the structure.

The present invention resolves prior art problems by providing a receptacle which is situated between the end portion of the tubular member and the structure and filled with a welding filler containing aluminum as base material. As a result of the melting temperature of the material aluminum and the still higher melting temperature of the welding filler, aluminum melts in the area of the receptacle filled with welding filler, causing a precise welded connection, on one hand. On the other hand, as the melting temperature of the welding filler is below the melting temperature of steel, a metallic adhesion effect is provided at the interface between the surface of the tubular member and the welding filler, causing formation of an intermetallic phase. This intermetallic phase is preferably formed in part when the tubular member is coated with tin or zinc. As a result, a metallic bond is established between the welding filler and the surface of the tubular member.

As the receptacle is filled with melt of the welding filler on the basis of aluminum, a reliable formfit is realized between the tubular member of steel and the structure of aluminum, in particular cast aluminum, with fusion penetration on the structure and a soldering effect on the surface of the tubular member.

The partial connection in accordance with the present invention is especially beneficial when the tubular member is constructed to form a torsion element of a twist-beam rear axle and the structure is a component of a longitudinal beam of the twist-beam rear axle. The steel tubular member is then connected on both ends to a structure of aluminum, in particular cast aluminum, by means of the welding filler based on aluminum.

According to another advantageous feature of the present invention, the end portion of the tubular member may fully traverse the recess of the structure, wherein two receptacles may be provided on opposite ends of the recess and configured in the form of circular-ring-shaped openings. Thus, the recess in the structure can be constructed as a through bore. The circular-ring-shaped openings have a particularly angled cross section so as to afford large welding areas in the structure despite the partial connection between the welding filler in the receptacles and the structure. The metallic adhesion effect between the welding filler and the surface of the tubular member is produced via the spaced regions with the welding filler.

According to another advantageous feature of the present invention, the end portion of the tubular member may have an oval-shaped configuration. As a result, the abutment effect between the tubular member and the structure is enhanced. The recess in the structure may accordingly also have an oval configuration.

According to another advantageous feature of the present invention, the end portion of the tubular member can have a radially projecting collar for placement in an annular groove of the structure, with the receptacle being defined by an outer surface of the end portion, a neighboring side of the collar, and an end-portion-proximal inner surface of the annular groove. As a result of the annular groove in the structure, a nipple of the structure is able to engage in the end portion. The nipple may be solid or formed with a length hole.

According to another advantageous feature of the present invention, the collar may be bent outwards at a right angle, and the annular groove may have a corresponding rectangular cross section.

According to another advantageous feature of the present invention, the collar may also be outwardly deflected in a diffuser-like manner and rest upon a complementary counter surface of the annular groove in the structure. It is, however, also conceivable to only support the end face of the collar in an angular annular groove, with the structure being configured hollow preferably.

According to another advantageous feature of the present invention, the end portion of the tubular member may have an outer surface provided with at least one trough in an area of the receptacle to further enhance a connection between the welding filler and the tubular member. Suitably, several such troughs are provided in circumferential spaced-apart relationship. As a result, the contact zone between the end portion of the tubular member and the welding filler can be increased to further enhance the desired metallic adhesion effect.

BRIEF DESCRIPTION OF THE DRAWING

Other features and advantages of the present invention will be more readily apparent upon reading the following descrip

DETAILED DESCRIPTION OF PREFERRED EMBODIMENTS

Figure 1:
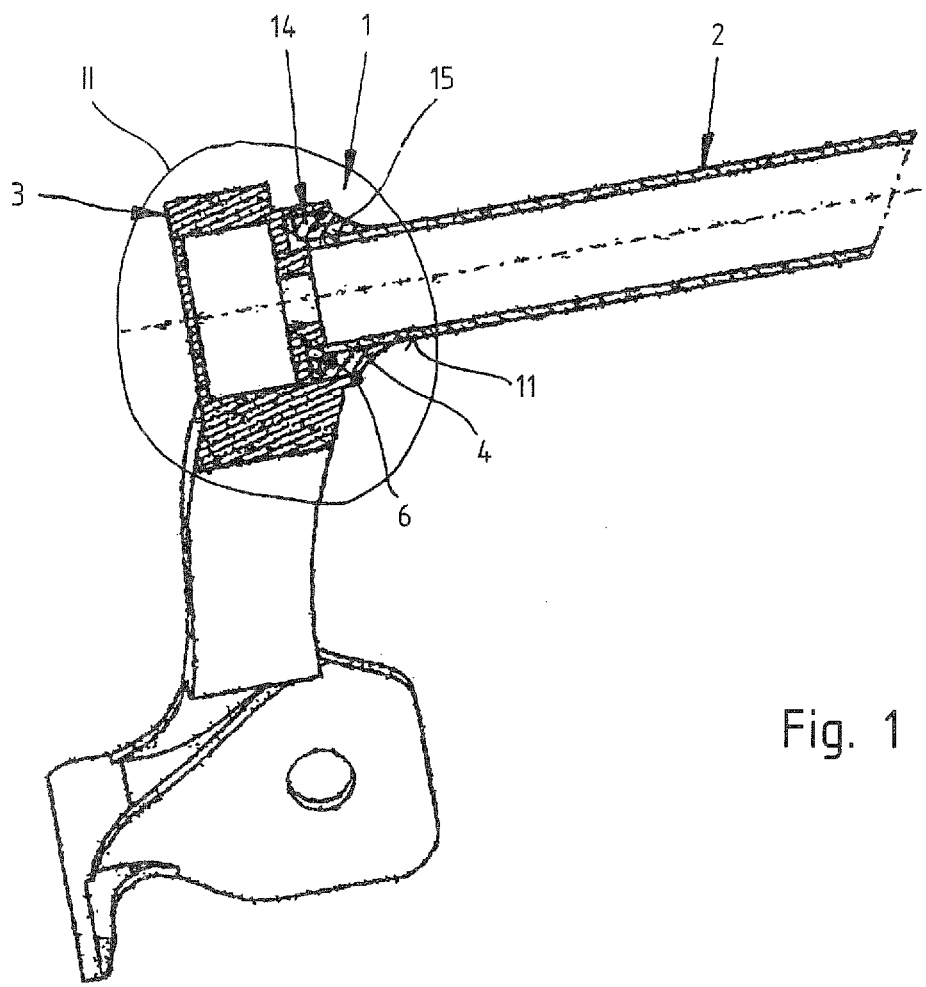
- FIG. 1 is a partial length section of one embodiment of an assembly of a tubular member of steel and a structure of aluminum connected in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a partial length section of one embodiment of an assembly, generally designated by reference numeral 1 and comprised of a tubular member 2 of steel and a structure 3 of aluminum connected in accordance with the present invention. The tubular member 2 forms hereby, for example, a torsion suspension of an otherwise unillustrated twist-beam rear axle for a motor vehicle, whereas the structure 3 may be a component of a longitudinal beam of the twist-beam rear axle, with the longitudinal beam being made of cast aluminum. The tubular member 2 has two end portions 4 (only one is shown here), each of which being connected with a structure 3.

Figure 2:
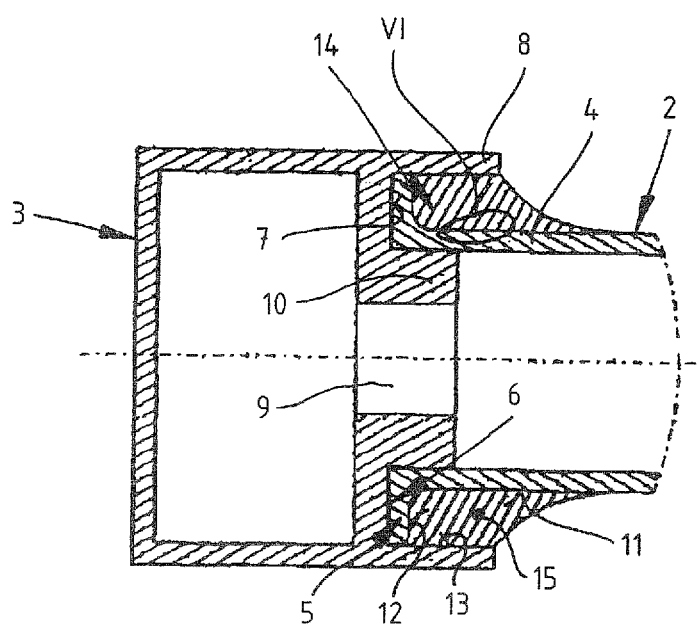
FIG. 2 is an enlarged detailed view of the area encircled in FIG. 1 and marked II.

As shown in FIG. 2, which is an enlarged detailed view of the area encircled in FIG. 1 and marked II, each end portion 4 of the tubular member 2 is provided with a radial collar 5 which is bent outwards at a right angle. The collar 5 is inserted in an annular groove 6 of the structure 3 which is partly hollow, whereby the collar 5 is hereby inserted until striking against the bottom 7 of the annular groove 6. The collar 5 is embraced by an outer wall 8 of the annular groove 6 whereas a nipple 10 of the structure 3 is formed with a bore 9 and engages the end portion 4.

The end portion 4 of the tubular member 2 has an outer surface 11 which together with an adjacent inner side 12 of the collar, 5 and an inner surface 13 of the outer wall 8 of the annular groove 6 in confronting relationship to the end portion 4 define a receptacle 14 which is filled with welding filler 15 on an aluminum basis. As a result of the melting temperatures of the welding filler 15, the aluminum structure 3, and the steel tubular member 2, an intimate fusion is realized at the contact area between welding filler 15 and structure 3, while a soldering effect is realized between the welding filler 15 and the surface 11 of the tubular member 2 as well as inner side 12 of the collar 5. Although not shown in drawings, the surface 11 of the end portion 4 as well as the inner side 12 of the collar 5 are advantageously provided with a metallic coating so as to form an intermetallic phase on the surface 11 and the inner side 12 and thereby enable the formation of a metallic adhesion effect with the welding filler 15 and thus a sufficiently stable jointed connection with the tubular member 2. Currently preferred is a coating on the basis of tin or zinc.

The end portion 4 of the tubular member 2 may be circular or oval. The annular groove 6 has a complementary configuration.

Figure 3:
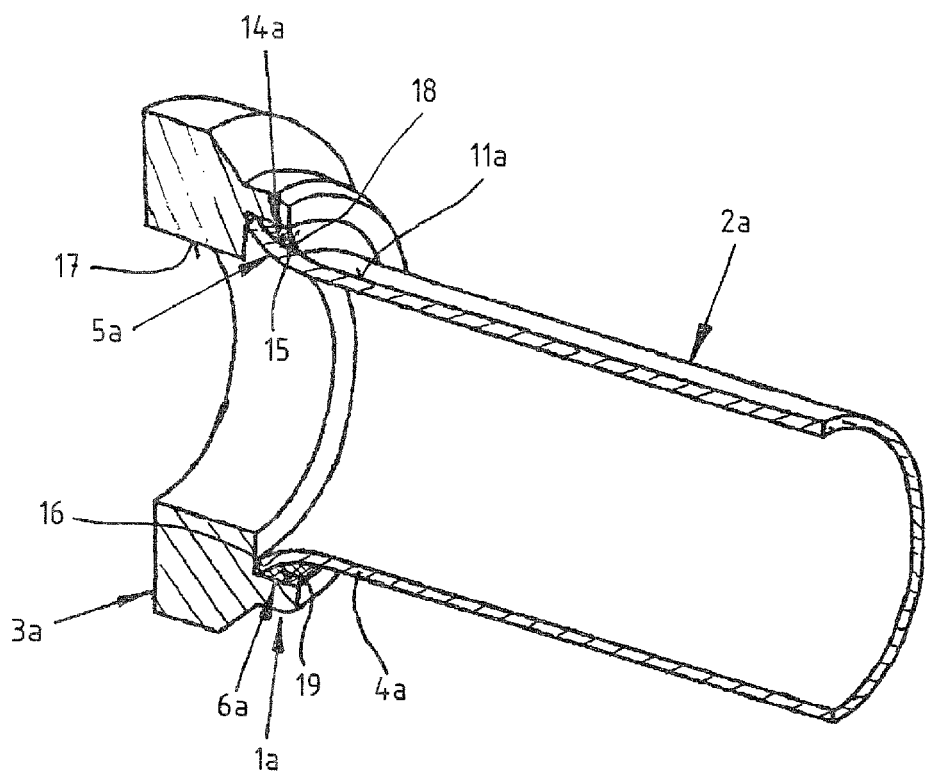
FIG. 3 is a vertical length section of still another embodiment of an assembly of a tubular member of steel and a structure of aluminum connected in accordance with the present invention.

FIG. 3 shows a vertical length section of another embodiment of an assembly, generally designated by reference numeral 1a of a tubular member 2a of steel and a structure 3a and comprised of aluminum connected in accordance with the present invention. In the following description, parts corresponding with those in FIG. 1 will be identified, where appropriate for the understanding of the invention, by corresponding reference numerals followed by an "a". The collar 5a formed on the end portion 4a of the tubular member 2a is deflected outwards or flared in a diffuser-like manner. The collar 5a has an end face 16 which engages an angular annular groove 6a in the structure 3a. The structure 3a is provided with a through bore 17. A receptacle 14a containing welding filler 15 on aluminum basis is defined between the outer surface 11a of the end portion 4a, an outer side 18 of the collar 5a, and an inner side 19 of the annular groove 6a. This type of connection also effectuates a welding between the structure 3a and the welding filler 15 as well as a metallic adhesion between the welding filler 15, the surface 11a of the end portion 4a of the tubular member 2a, and the outer side 18 of the collar 5a.

Figure 4:
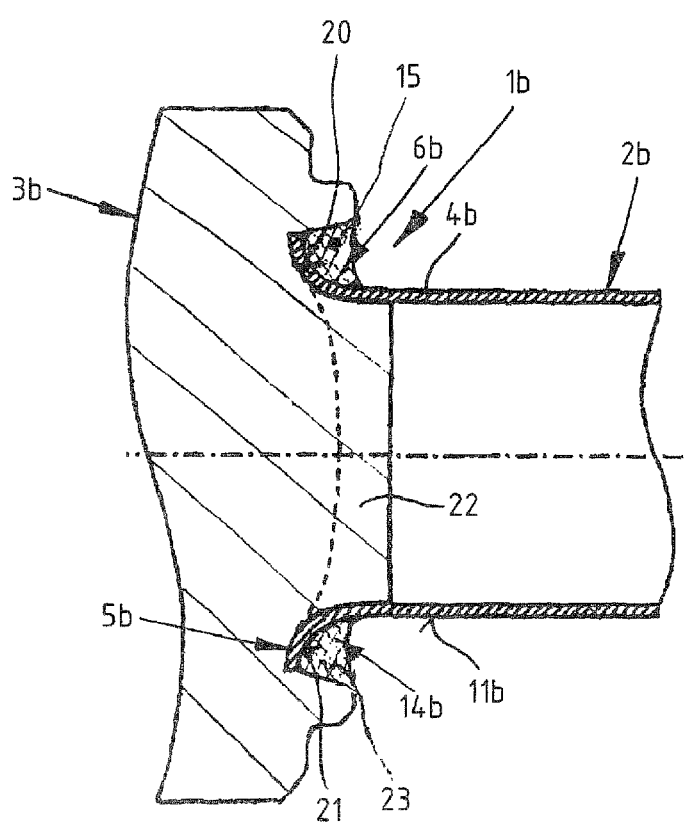
FIG. 4 is a vertical length section of still another embodiment of an assembly of a tubular member of steel and a structure of aluminum connected in accordance with the present invention.

FIG. 4 shows a vertical length section of still another embodiment of an assembly, generally designated by reference numeral 1b and comprised of a tubular member 2b of steel and a structure 3b of aluminum, preferably cast aluminum, connected in accordance with the present invention. In the following description, parts corresponding with those in FIG. 1 will be identified, where appropriate for the understanding of the invention, by corresponding reference numerals followed by a "b". In this embodiment, the structure 3b has a compact configuration, with the outwardly deflected collar 5b on the end portion 4b of the tubular member 2b resting against a complementary inner wall 20 of the annular groove 6b in the structure 3b. A receptacle 14b containing welding filler 15 on aluminum basis is defined between the outer surface 21 of the collar 5b, a nipple 22 of the structure 3b, and a radially outer inner side 23 of the annular groove 6a. The welding filler 15 undergoes an intimate fusion with the material of the structure 3b, whereas a metallic adhesion is established with the tubular member 3b as a consequence of the presence of an outer coating, advantageously of tin or zinc.

Figure 5:
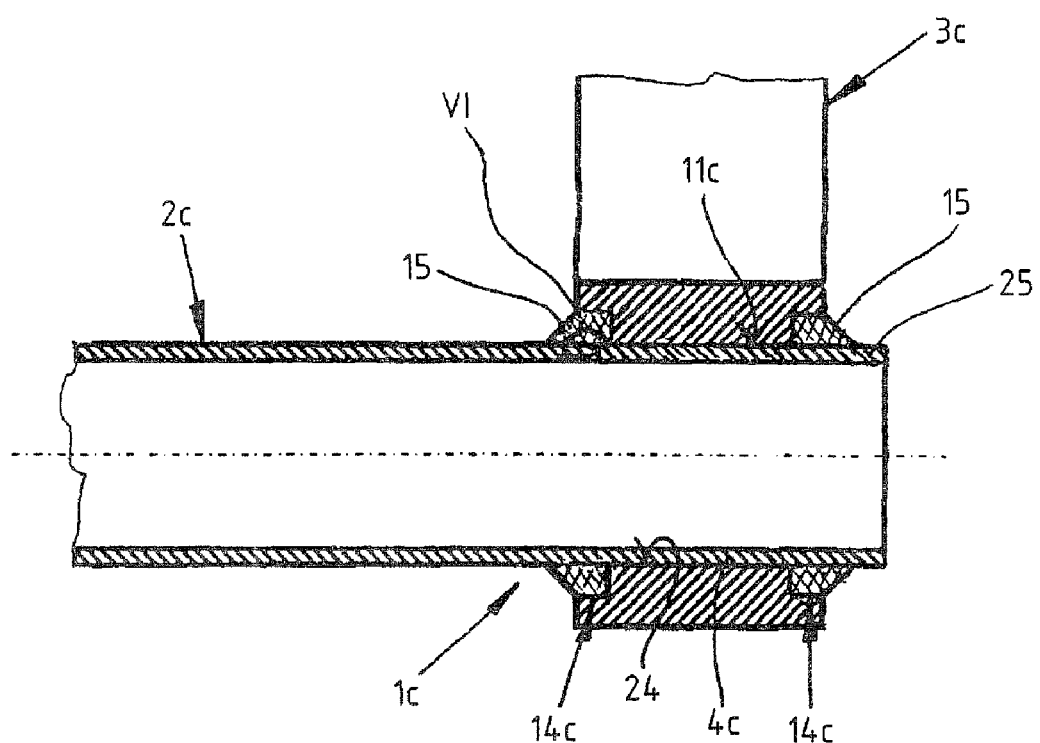
FIG. 5 is a vertical length section of yet another embodiment of an assembly of a tubular member of steel and a structure of aluminum connected in accordance with the present invention.

FIG. 5 shows a vertical length section of still another embodiment of an assembly, generally designated by reference numeral 1c and comprised of a tubular member 2c of steel and a structure 3c of aluminum, preferably cast aluminum, connected in accordance with the present invention. In the following description, parts corresponding with those in FIG. 1 will be identified, where appropriate for the understanding of the invention, by corresponding reference numerals followed by a "c". In this embodiment, the end portion 4c of the tubular member 2c fully extends through a recess 24 in the structure 3c. In other words, a section 25 of the end portion 4c protrudes beyond the structure 3c. The recess 24 conforms to the cross section (round or oval) of the end portion 4c. Angular receptacles 14c in the form of circular-ring-shaped openings are formed on both ends of the recess 24 for accommodating the welding filler 15 on aluminum basis. The surface 11c of the end portion 4c is also provided in this embodiment with a coating of tin or zinc. The welding filler 15 undergoes an intimate fusion with the structure 3c, whereas a metallic adhesion effect is realized via an intermetallic phase on the end portion 4c.

Figure 6:
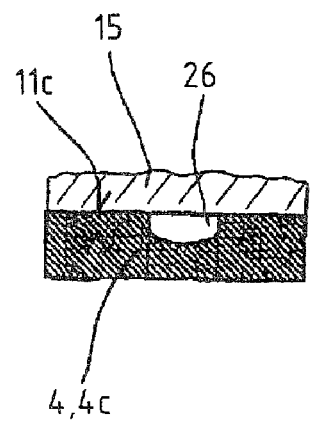
FIG. 6 is an enlarged detailed view of the area encircled in FIGS. 2 and 5 and marked VI.

As can be further seen in FIGS. 2, 5 and 6, the contact surface between the welding filler 15 and the tubular member 2, 2c in the outer surface 11, 11c of the end portion 4, 4c of the tubular member 2, 2c can be increased by providing at least one trough 26 (embossment) in the area of the receptacles 14, 14c. Of course, several troughs 26 can be provided in circumferential spaced-apart relationship. In this way, the metallic adhesion effect between the welding filler 15 and the end portion 4, 4c of the tubular member 2, 2c can be increased.

Of course, troughs 26 may also be provided in the assemblies 1a, 1b in the area of the receptacles 14a, 14b.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

The invention claimed is:

1. In combination, an assembly comprising:
    a tubular member made of steel and having an end portion;
    a structure made of aluminum and having a recess in which the end portion is received in direct formfitting contact with the structure; and
    at least one receptacle forming adjacent to the end portion in the recess a circumferential undercut between the end portion of the tubular member and the structure, said receptacle being filled with a welding filler containing aluminum as base material for effecting a material joint in the form of an initmate fusion in a contact area between the welding filler and the structure and in the form of a soldering effect between the welding filler and the tubular member.

2. The assembly of claim 1, wherein the end portion of the tubular member fully traverses the recess of the structure, wherein two of said receptacle are provided on opposite ends of the recess and configured in the form of circular-ring-shaped openings.

3. The assembly of claim 1, wherein the end portion of the tubular member has an oval-shaped configuration.

4. The assembly of claim 1, wherein the end portion of the tubular member has a radially projecting collar for insertion in an annular groove of the structure, said receptacle being defined by an outer surface of the end portion, a neighboring side of the collar, and an end-portion-proximal inner surface of the annular groove.

5. The assembly of claim 4, wherein the collar is bent outwards at a right angle, and the annular groove has a rectangular cross section.

6. The assembly of claim 4, wherein the collar is outwardly deflected.

7. The assembly of claim 1, wherein the end portion of the tubular member has an outer surface provided with at least one trough in an area of the receptacle.

8. The assembly of claim 1, wherein the tubular member is coated with a metallic layer.

9. The assembly of claim 1, wherein the metallic layer is tin or zinc.

* * * * *